United States Patent [19]

Yamamoto et al.

[11] 4,388,641

[45] Jun. 14, 1983

[54] CENTERING UNIT FOR A COLOR TELEVISION CAMERA APPARATUS HAVING PLURAL PICK-UP TUBES

[75] Inventors: Setsuo Yamamoto; Yasuichi Ushiyama, both of Tokyo, Japan

[73] Assignee: Nippon Electric Co., Ltd., Tokyo, Japan

[21] Appl. No.: 246,546

[22] Filed: Mar. 23, 1981

[30] Foreign Application Priority Data

Mar. 31, 1980 [JP] Japan .................................. 55/41684

[51] Int. Cl.³ .............................................. H04N 9/09
[52] U.S. Cl. ...................................................... 358/51
[58] Field of Search ......................................... 358/51

[56] References Cited

U.S. PATENT DOCUMENTS

| | | | |
|---|---|---|---|
| 3,404,220 | 10/1968 | Favreau | 358/51 |
| 4,133,003 | 1/1979 | Flory et al. | 358/51 |
| 4,234,890 | 11/1980 | Astle et al. | 358/51 |

Primary Examiner—Richard Murray
Attorney, Agent, or Firm—Sughrue, Mion, Zinn, Macpeak, and Seas

[57] ABSTRACT

In an automatic centering unit for a color television camera, a signal representing a phase-difference between video signals of different color channels is picked up to produce a correction voltage only when correlation of video signals exists for each selected discrete area on the television screen between predetermined time points having an interval of time of at least a frame period, so that the centering unit allows an accurate and quick operation even if focusing is not sufficient or if noise is contained in the video signal.

9 Claims, 7 Drawing Figures

CENTERING UNIT FOR A COLOR TELEVISION CAMERA APPARATUS HAVING PLURAL PICK-UP TUBES

BACKGROUND OF THE INVENTION

The present invention relates to a centering unit for a color television camera apparatus having plural pick-up tubes.

Two methods for centering of a three tube color television camera are generally known. The first method uses a specific test chart to produce a centering correction voltage which corresponds to the phase difference between video signals of two channels, i.e., green and red, or green and blue channels. This method is disclosed in Japanese Patent Publication No. 51-3453. In this method, however, a predetermined test pattern must be picked up. This hinders the smooth operation of television camera apparatus, particularly in the case of portable television camera apparatus.

A second method is disclosed in the paper entitled "Automatic Centering Unit for the Registration of a Color Television Camera," Jour. SMPTE, 81: 4–13, January 1972. This method is performed without a specific test chart. In the second method, leading (or trailing) edges contained in video signals of two channels are extracted, respectively, and compared with each another so as to produce the centering correction signal. This system has a drawback that erroneous operation is likely when a video signal is not sufficiently focused, has a low level portion, or contains noise, since the system uses an arbitrary video signal for producing the centering correction signal. In view of this, in order to prevent the erroneous operation, the centering operation in this method is performed at an extremely slow control speed to prevent temporary error data. Therefore, this control method requires a long control time. Alternatively, there is employed a circuit for ceasing the control when amounts of error at positions displaced from each other by a given distance in one picture (field) are not equal. In order to lessen the possibility of the occurance of erroneous operation by this method, however, it is necessary to compare various error amounts at various positions in the field to decide whether the control is performed. This has the drawbacks that a circuit arrangement is complicated, and there is the possibility that the centering adjustment is scarcely actually controlled.

SUMMARY OF THE INVENTION

An object of the present invention is to provide an automatic centering unit for a color television camera which can perform the centering accurately and quickly, free from erroneous operation, even if the focusing is not sufficient or contains noise.

In a centering unit for a color television camera apparatus according to the present invention, a plurality of detection areas are arranged in a television screen. A correlation of each area between predetermined time points having an interval of integer times the frame period is checked. When, and only when, the correlation is high, the signal representing the phase-difference is picked up and integrated (averaged) over all the high-correlation areas to form a centering control signal. As just mentioned, the phase-difference signals between the different channels are picked up in only the areas having high-correlation. This feature completely eliminates the erroneous operation inherent to the conventional centering unit when the detection of the edge of a video signal is unstable due to insufficient focusing of the video signal or noise contained therein.

Other objects and advantages of the present invention will be apparent from the following description taken in connection with the accompanying drawings; in which:

DETAILED DESCRIPTION OF THE PREFERRED EMBODIMENTS

Figure 1:
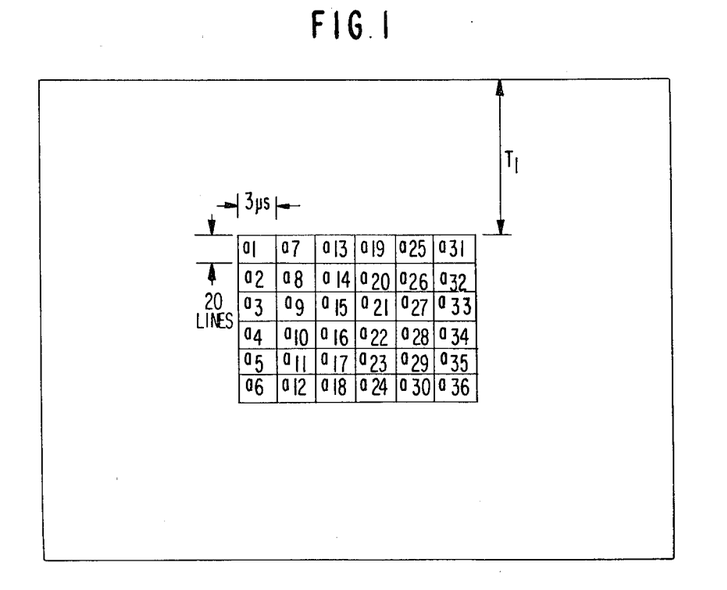
FIG. 1 illustrates an example of an arrangement of a plurality of phase-difference detecting areas on a television screen in the invention.

The present invention will be described in detail referring to the accompanying drawings. FIG. 1 illustrates an example of a plurality of phase-difference detecting areas segmented in a matrix fashion on a television screen. Each area has a size of 3 $\mu s$ in the horizontal direction and 20 lines in the vertical direction. The areas denoted as $a_1$ to $a_{36}$ are swept in the order of $a_1$ to $a_{36}$ so as to form a correction voltage. In order to complete the sweep of all the thirty-six areas shown in FIG. 1, six fields, i.e., three frames, are required, because one column of the areas is swept for each field.

Figure 2:
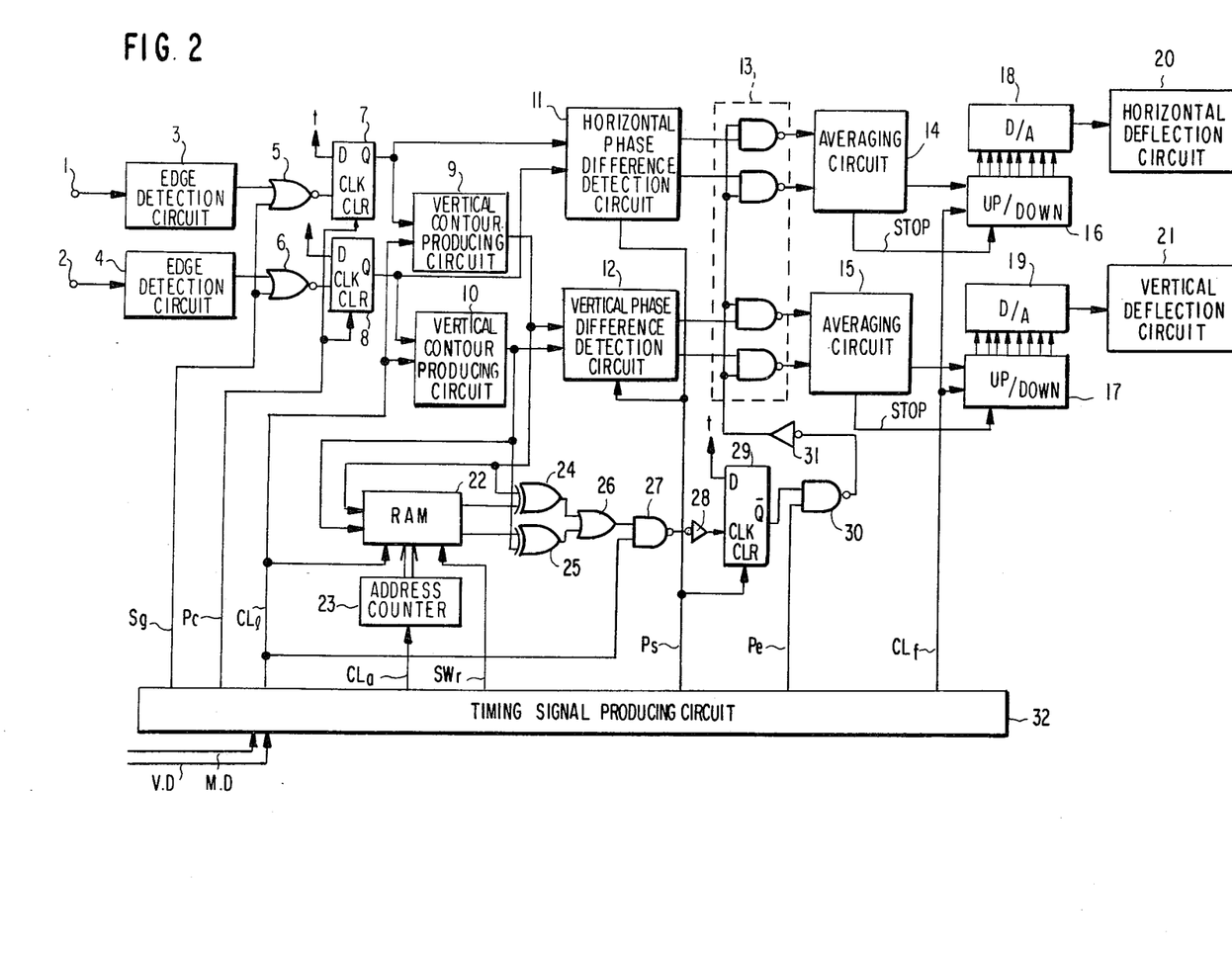
FIG. 2 is a block diagram showing an embodiment of an automatic centering unit according to the present invention.
Figure 3:
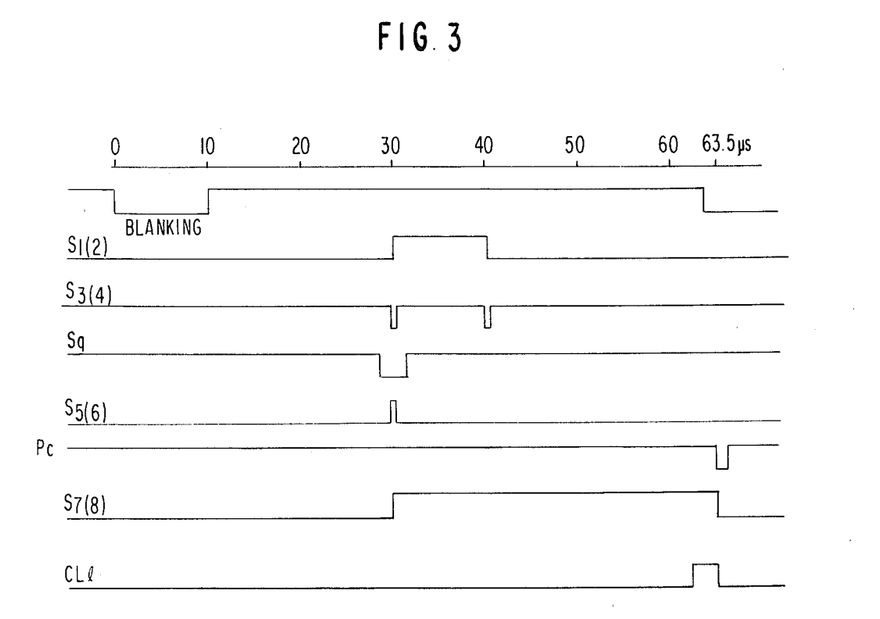
FIG. 3 is a set of waveforms illustrating signals at main portions in the circuit shown in FIG. 2, particularly in a horizontal period.
Figure 4:
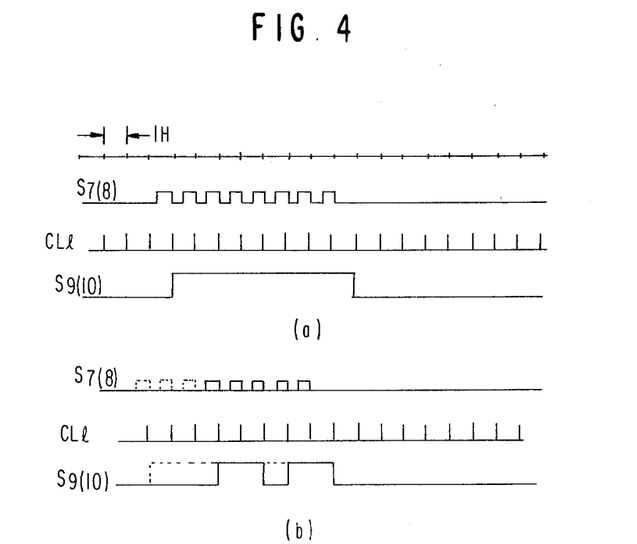
FIGS. 4(a) and 4(b) are sets of waveforms illustrating signals at main portions in the circuit shown in FIG. 2, which are useful particularly in explaining a vertical contour signal reproducing operations.

FIG. 2 shows an embodiment of an automatic centering unit according to the present invention. FIGS. 3 and 4 are signal waveforms at main portions in the circuit shown in FIG. 2; FIG. 3 is for explaining the horizontal operation and FIG. 4 for explaining the vertical operation. In FIG. 2, video signals $S_1$ and $S_2$ are respectively supplied from different channels, for example, green and red channels, to video input terminals 1 and 2. The video signals $S_1$ and $S_2$ are respectively supplied to edge detecting circuits 3 and 4 where predetermined leading and trailing edges of those signals are detected. As the result of the edge detection, the edge detecting circuits 3 and 4, respectively, produce detection pulses $P_3$ and $P_4$ having negative polarity in the present embodiment, at the time points of the leading and trailing edges.

The detection pulses $P_3$ and $P_4$ from the edge detecting circuits 3 and 4 are supplied through gates 5 and 6 to flip-flops 7 and 8, the respective edge. The gates 5 and 6 permit respectively the edge detection pulses to pass therethrough only during periods of the areas shown in FIG. 1 (the signals after passed therethrough are denoted as $P_5$ and $P_6$). To this end, a sample gate signal $S_g$ (which will be described in detail later) is supplied to the other inputs of the gates 5 and 6.

The flip-flops 7 and 8, respectively, receive the edge detection pulses $P_5$ and $P_6$ passed through the gates 5 and 6 and a line clear pulse $P_c$ to form signals $S_7$ and $S_8$ representing the periods between the pulses $P_5$ and $P_6$ and the end of each line, respectively.

The output signals $S_7$ and $S_8$ from the flip-flops 7 and 8 are supplied to vertical contour producing circuits 9 and 10 and also to a horizontal phase comparing circuit 11. The horizontal phase comparing circuit 11 compares the leading edges of the output signals $S_7$ and $S_8$ from the flip-flops 7 and 8 to detect a horizontal phase-difference between the video signals $S_1$ and $S_2$. As the result of the phase comparison, the comparing circuit 11 produces a signal representing whether the signal $S_1$ leads or lags with respect to the signal $S_2$, that is, whether the former lies on the left or right sides of the latter in FIG. 3. The vertical contour producing circuits 9 and 10 receive the signals $S_7$ and $S_8$, respectively, and a clock signal $CL_1$ to form signals $S_9$ and $S_{10}$ representative of the vertical contour periods.

The vertical signals $S_9$ and $S_{10}$ can be formed by sampling and holding the output signals $S_7$ and $S_8$ from the flip-flops 7 and 8, respectively, at the timing of the line clock signal $CL_1$, as shown in FIG. 4(a). The output signals from the vertical contour producing circuits 9 and 10 are supplied to a vertical phase comparing circuit 12 where a vertical phase difference (phase shift) is detected. The shift may be detected by merely comparing at least either of the leading edge and the trailing edge of the signals $S_9$ and $S_{10}$. Through the comparison, it is checked if the video signal $S_1$ leads or lags with respect to the video signal $S_2$, that is to say, the former lies below or above the latter. The horizontal and vertical phase comparing circuits 11 and 12 provide the detecting result of each area shown in FIG. 1. To this end, an area start pulse $P_s$ generated at the start of each area is supplied to the comparing circuits 11 and 12 from a timing producing circuit 32 to reset the circuits 11 and 12 at this timing. Thus, the comparing circuits 11 and 12 provide four signals representing four states; the signal $S_1$ lies on the right or left side of, and above or below the signals $S_2$, when each of the four signal has a high level. When the phases of both the signals are coincident with each other, those four signals are all in low level.

The comparing circuit 11 is so designed that, when a signal is absent at one of the inputs of the comparing circuit, the circuit produces output signals of low levels. Therefore, the output signal of the comparing circuit 11 appears free from an error even when the video signal has such a low level or insufficient focusing that the edge of the video signal is not detected, or when a noise is contained in the video signal. However, the vertical phase comparing circuit 12 may adversely be influenced by the low level signal, the insufficient focusing signal or noise contained in the video signal because of the presence of the vertical contour producing circuits 9 and 10. More specifically, when low level portions are contained in a some of the lines due to insufficient focusing, the centering unit fails to detect edges of the video signals. Furthermore, when noise is contained in the video signal, the centering unit mistakenly detects the noise as an edge. For example, when the signal level is partially low, the portions as indicated by broken lines in the output signal $S_{7(8)}$ are not produced as shown in FIG. 4(b). As a result, the output signal $S_{9(10)}$ of the vertical contour producing circuit 9(10) has a serrated waveform as shown in FIG. 4(b). Thus, the presence of the insufficient focusing or noise causes the vertical phase comparing circuit 12 to produce a signal representing an erroneous detection.

In the present invention, in order to prevent such an erroneous operation, the video signal is correlated between time points having an interval of several frames. Only when the correlation is high, that is to say both signals have the same waveforms between two different time points, are the output signals from the comparing circuits 11 and 12 permitted to undergo further processing. To accomplish this, a gate circuit 13 is provided at the post-stage of the comparing circuits 11 and 12. The circuit section which controls the gate circuit 13 in accordance with the result of detecting the correlation will be described in detail later.

The output signals from the phase comparing circuits 11 and 12 are passed through the gate circuit 13 where the polarity of the output signals are inverted, and are supplied to averaging circuits 14 and 15. The averaging circuits 14 and 15 receive the output signals representative of phase lead or phase lag which are delivered through the gate circuit 13 from the phase comparing circuits 11 and 12, respectively, and judge whether the phase lead areas dominate in those sample areas $a_1$ to $a_{36}$ or the phase lag areas do. Each of the averaging circuits 14 and 15 may readily be constructed of a counter which counts up in response to a signal representing the lead phase from the phase comparing circuits and counts down in response to a signal representing the phase lag, and a comparing circuit for comparing the counted value from the counter with a predetermined value.

The outputs of the averaging circuits 14 and 15 representing results averaged all over the areas $a_1$–$a_{36}$, i.e., phase-lead, phase-lag or phase-coincident, are supplied to up/down counters 16 and 17 in order to count up or down the contents of the counters 16 and 17, or in order to stop the counting operation in response to the averaged results, respectively. A clock $CL_f$, which is generated by timing producing circuits 32 every other time the sample areas $a_1$ to $a_{36}$ are swept, i.e., every six frames in the embodiment, is supplied to the up/down counters 16 and 17 as a clock pulse. The outputs of the counters 16 and 17 are respectively supplied to D/A converters 18 and 19 where the outputs are converted to analog DC voltages.

The DC voltages from the D/A converters 18 and 19, respectively, are supplied as horizontal and vertical centering correction voltages to horizontal and vertical deflection circuits 20 and 21 for the image pickup tube which produces the video signal $S_2$. The phases of the vertical and horizontal deflection signals of the image pickup tube are caused to lead or lag in accordance with the centering correcting signal, so that the scanning of the image pickup tubes for the video signals $S_2$ and $S_1$ is completely coincident. In the present invention, when the scanning of the two image pickup tubes is completely coincident, it is possible to stop the operation of the up/down counters 16 and 17 and to disconnect them from the averaging circuits 14 and 15. For this reason, the circuit section from the edge detecting circuits 3 and 4 to the averaging circuits 14 and 15 may be used in time sharing fashion for the centering adjustment between the remaining channels.

The circuit for detecting correlation of the video signal between the time points having an interval of several frames to control the gate circuit 13 will be described. An array of the sampling areas $a_1$ to $a_{36}$ are assigned as shown in FIG. 1 in this embodiment and the vertical contour signals derived from the vertical contour reproducing circuits 9 and 10 are stored in a RAM 22. The RAM 22 is subjected to a write operation during a period that all the sample areas $a_1$ to $a_{36}$ are swept, i.e., during three frames, and to a read operation during the succeeding three frames. A write/read control signal $S_{wr}$, having a polarity that is inverted every three frames, is supplied to the $RAM_{22}$. Write or read address for the RAM 22 is produced by an address counter 23. An address clock $CL_a$ is supplied to the address counter 23 for producing address signals corresponding to the sample areas $a_1$ to $a_{36}$. The clock $CL_a$, having a frequency is equal to that of the horizontal synchronizing signal, is generated during the period of the sample areas $a_1$ to $a_6$ or $a_7$ to $a_{12}$ or the like in the vertical direction. The capacity of the RAM 22 is $20 \times 36 \times 2 = 1,440$ bits, since 20 lines are included in one sample area, the number of the sample areas is 36 and the video signals of two channels are stored.

During the three frames following the three frames for the write operation, the read operation is performed to read out the contour signals. The contour signals thus read out are supplied to one input terminal of each of exclusive OR gates 24 and 25. At this time, the contour signals produced from the vertical contour producing circuits 9 and 10 are supplied to the other input terminals of the exclusive OR gates 24 and 25, respectively. In the exclusive OR gates 24 and 25, the contour signals read out from the RAM 22 are respectively compared with the contour signals from the contour signals producing circuits 9 and 10 for each sample area $a_1$ to $a_{36}$ to control the gate circuit 13.

The outputs of the exclusive OR gates 24 and 25 are supplied to an OR gate 26, and are in Low (L) level when both input signals are equal. In this case, the L level-outputs of the gates 24 and 25 are supplied to a NAND gate 27 through the OR gate 26. The NAND gate produces a NAND output of the output from the OR gate 26 and the line clock pulse $CL_1$. The output of the NAND gate is supplied through an inverter 28 to flip-flop 29 as a clock pulse. In the event that the OR gate 26 maintains L level for all the twenty-lines of one area, no clock pulse is transmitted to the flip-flop 29. Accordingly, the flip-flop 29 is kept cleared by the area start pulse $P_s$ and the High (H) level of the output $\overline{Q}$ enables a gate 30. At this time, the area end pulse $P_e$ is supplied through the gate 30 and the inverter 31 to the gate circuit 13 to enable the gate circuit 13 at the timing of the pulse $P_e$ to lead the output signals from the phase comparing circuits 11 and 12 to the averaging circuits 14 and 15. On the other hand, when there are lines having no correlation therebetween, or different lines, in one area in at least one channel, the output signal from the OR gate 26 becomes H level at that time. The H level enables the line clock $CL_1$ to be applied to the clock input terminal of the flip-flop 29. As a result, the $\overline{Q}$ output of the flip-flop 29 is turned to L level and the gate circuit 13 is disabled. Therefore, the output signals from the phase comparing circuits 11 and 12 are not supplied to the averaging circuits 14 and 15, respectively. As described above, the centering unit of the present invention applies the phase difference signal to the averaging circuits 14 and 15 only when each area has lines having a high correlation therebetween. Therefore, the centering unit can completely eliminate the erroneous operation caused by the low level portion in the video signal or noise contained therein.

The centering unit of the present invention may be designed to detect the correlation in the horizontal direction. However, the present embodiment takes advantage of the vertical contour signal to detect the correlation. The use of the vertical contour signal for the correlation detection has the following advantages: (i) In storing the video signal in the horizontal direction, the sampling frequency is higher than the horizontal synchronizing frequency, so that a circuit to form the sampling frequency or to form clock pulses for the write operation is required. On the other hand, in the case of vertical direction, the horizontal synchronizing signal may directly be used as the write clock pulses. (ii) The memory capacity of the memory is decreased. In the case of the correlation detection by the vertical contour signal, the necessary memory capacity is 1/10 compared to a case where the horizontal line of each area is sampled by 10 pulses, for example. (iii) The vertical contour signal is formed on the basis of the edge detection signal in the horizontal line. Therefore, it may be considered that the horizontal information is contained in the vertical contour signal.

Figure 5:
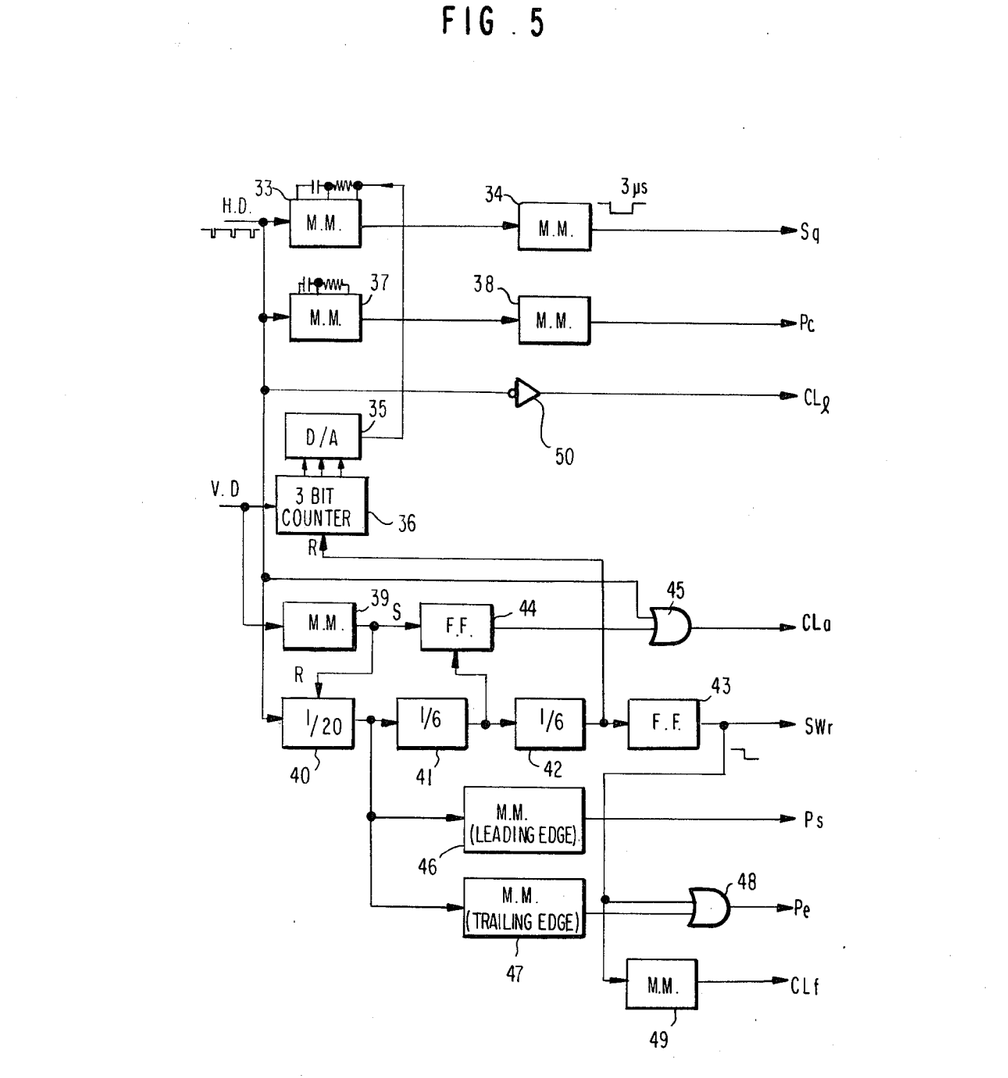
FIG. 5 is a block diagram showing a circuit for generating various timing signals used in the circuit shown in FIG. 2.

The timing producing circuit 32 for producing various timing signals and pulses used in the circuit shown in FIG. 2 will be described referring to FIG. 5. As mentioned above, those signals and pulses are: the sample gate signal $S_g$, the line clear pulse $P_c$, the line clock $CL_1$, the address clock $CL_a$, the write/read control signal $S_{wr}$, the area start pulse $P_s$, the area end pulse $P_e$, and the clock $CL_f$ which is generated every six frames. The sample gate signal $S_g$ is a signal with a width of 3 $\mu$s in the horizontal direction in each sample area, of which the leading edge timing is determined by a multivibrator 33 which receives the horizontal drive signal H.D. and the 3 $\mu$s width of the signal is determined by a multivibrator 34. The leading edge timing of the sample gate signal $S_g$ is different for every column of the sample area array. For this reason, a control signal to determine the leading edge timing of the sample gate signal $S_g$ is supplied from a D/A converter 35 to the multivibrator 33. The D/A converter 35 converts the count of a three-bit counter 36 to an analog signal. The three-bit counter 36 receives a vertical drive signal V.D. as a clock pulse and changes its contents for each vertical scanning, or each field, so as to change a starting point of the sample gate signal $S_g$. The counter 36 is reset by the output of a counter 42.

The line clear pulse $P_c$ is generated when the horizontal scanning terminates as shown in FIG. 3, and clears the flip-flops 7 and 8 (FIG. 2) at this timing. The timing and width of the pulse $P_c$ is determined by multivibrators 37 and 38, respectively. The line clock $CL_1$ is obtained by inverting the negative polarity horizontal drive signal H.D. by an inverter 50.

The write/read control signal $S_{wr}$ will be described. A multivibrator 39 receiving the vertical drive signal V.D. determines the start of the area array following the start of the vertical scanning, that is to say, the timing delayed by $T_1 (\approx 10$ ms) behind the start of the vertical scanning in FIG. 2. A counter 40 is reset at this timing. The counter 40 receives the horizontal drive signal H.D. as a clock pulse to count twenty of the clock pulses, and produces pulses for segmenting the respective areas, which consist of twenty lines, under the reset control by the multivibrator 39. The output signal from the counter 40 is transferred to a counter 41 where it is frequency-divided by six. The output signal from the counter 41 indicates that the final detected area, for example, $a_6, a_{12}, \ldots a_{36}$ is terminated at each vertical scanning (one field). The output signal from the counter 41 is applied to a counter 42 where it is frequency-divided by six. Accordingly, the output signal from the counter 42 is produced every six fields, i.e., three frames, and is applied to a flip-flop 43. The output signal from the flip-flop 43 changes its polarity every time the counter 42 produces an output signal. Therefore, the output signal from the flip-flop 43 is used as the write-/read control signal $S_{wr}$ for the RAM 22 (FIG. 2).

The output signal from the multivibrator 39 stands for the start of the detecting area at every vertical scanning. The output signal from the counter 41 stands for the end of the detecting area at every vertical scanning. Accordingly, the output signal from the flip-flop 44, which receives at the set input terminal the output signal from the multivibrator 39 and at the reset input terminal the output signal from the counter 41, represents a period of the detecting area in one vertical scanning period. This signal controls the passage of the horizontal drive signal H.D. through a gate 45. The horizontal drive signal H.D. passed through the gate 45 is supplied as a clock pulse to the address counter 23 (FIG. 2).

The output signal from the counter 40 which represents the period of each detecting area in the vertical direction, that is, segments the respective columns $a_1$ to $a_6$, $a_7$ to $a_{12} \ldots a_{31}$ to $a_{36}$ in the sample area array, is supplied to multivibrators 46 and 47. The multivibrators 46 and 47 produce pulses representing the leading and trailing edges of the output signal from the counter 40, respectively. The output signal from the multivibrator 46 produced at the leading edge of the output signal from the counter 40 is applied as the area start pulse $P_s$. The output signal from the multivibrator 47 produced at the trailing edge of the output signal from the counter 40 is applied through a NAND gate 48 as the area end pulse $P_e$. The NAND gate 48 receiving the output signals from the multivibrator 47 and the flip-flop 43 is provided to supply the area end pulse $P_e$ during only the read mode of the RAM 22. The output signal from the flip-flop 43 is supplied to a multivibrator 49 which produces a pulse at the trailing edge of the output signal supplied thereto. The pulse thus formed is applied to the up/down counters 16 and 17 as the clock pulse $CL_f$ appearing every six frames.

Figure 6:
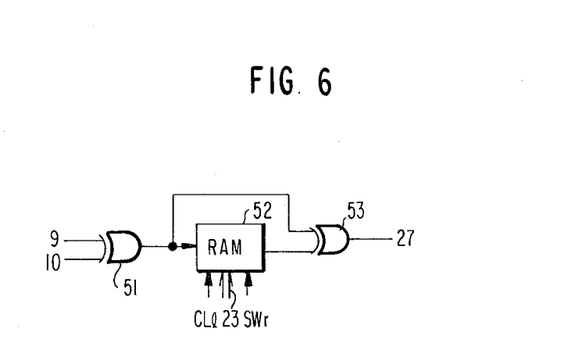
FIG. 6 is a logical circuit diagram showing another embodiment of a circuit including a RAM and its periphery in FIG. 2.

In the embodiment shown in FIG. 2, the memory capacity of the RAM 22 must be 1440 bits in order to store the respective area information of two channels. The memory capacity of 1440 bits may be reduced into a ½ memory capacity. A logic circuit shown in FIG. 6 is used for the RAM of the ½ memory capacity and corresponds to the circuit portion including the RAM 22, the exclusive OR gates 24 and 25, and the OR gate 26 in FIG. 2. In FIG. 6, the output signals from the vertical contour producing circuits 9 and 10 (FIG. 2) are stored in a RAM 52 via an exclusive OR gate 51. In this case, the capacity of the RAM 52 is merely 720 bits corresponding to one channel. The output signal from the RAM 52 delayed three frames and the output signal from the gate 51 are compared by an exclusive OR gate 53. The result of the comparison is applied to the gate 31 (FIG. 2). As shown in FIG. 6, a phase difference between the channels may be checked by the exclusive OR gate 51 and the phase differences before and after three frames may be compared to detect a correlation therebetween.

What is claimed is:

1. A centering unit for a color television camera apparatus having plural pick-up tubes corresponding to different color channels comprising:
    means for auto correlating signals representative of video signals of the same color channel occurring at discrete detection areas on television screens to produce correlation signals for the respective detection areas when correlation is detected for each area, said signals being correlated over a time period of at least one frame period,
    means for detecting a phase difference between video signals corresponding to two different color channels in each of said plural detection areas to produce phase difference signals for the respective detection areas;
    gate means for passing said phase-difference signals derived from said phase difference detecting means in response to said correlation signal for corresponding detection areas to the respective phase difference signals;
    means for averaging the phase difference signals passed through said gate means over said plural detection areas; and
    means for producing a correction voltage in accordance with the output of said averaging means to shift a deflection timing of at least one of said two different color channels.

2. The centering unit as claimed in claim 1, in which said phase difference detecting means includes a first and second edge detection circuits for respectively detecting edges contained in video signals corresponding to the two different color channels and respectively producing a first and second detection signals,
    means for generating sample gate signals corresponding to the respective plural detection areas,
    a gate circuit for passing said first and second edge detection signals in response to the sample gate signal for the corresponding detection area, and
    means for detecting a timing difference between said first and second edge detection signals derived from said gate circuit and producing said phase difference signal for each detection area.

3. The centering unit as claimed in claim 2, in which said correlation detecting means includes memory means for storing said first and second edge detection signals corresponding to said two different color channels and
    means for comparing the first and second edge detection signals read out from said memory means respectively with the first and second detection signals derived from said gate circuit, said latter signals being derived at said time period after derivation of said former signals.

4. The centering unit as claimed in claim 2, in which said correlation detecting means includes means for producing a representative signal from said first and second edge detection signals,
    means for delaying said representative signal by said time period, and
    means for comparing said representative signal with the delayed representative signal.

5. A centering unit for a color television camera apparatus having plural pick-up tubes corresponding to different color channels comprising:
    means for detecting edges contained in video signals corresponding to two different color channels and producing edge detection signals;

means for producing sample gate signals corresponding to plural detection areas, said plural detection areas being previously assigned to a television screen;

first gate means for operatively passing said edge detection signals in response to said sample gate signals;

means for detecting a horizontal timing difference between said edge detection signals derived from said first gate means and producing a horizontal phase difference signal;

means receiving said edge detection signals derived from said first gate means for producing two vertical contour signals respectively corresponding to said two different color channels;

means for detecting a vertical timing difference between said vertical contour signals and producing a vertical phase difference signal;

memory means for storing said vertical contour signals;

means for determining a correlation of each plural detection areas between two time points having at least one frame period by comparing the vertical contour signals read out from said memory means with the vertical contour signals derived from said vertical contour producing means, the vertical contour signals to be compared corresponding to the same color channel;

second gate means for operatively passing said horizontal and vertical phase difference signals in response to the high-correlation in each of said plural detection areas determined by said correlation determining means;

first averaging means for averaging said horizontal phase difference signal derived from said second gate means over said plural detection areas;

second averaging means for said vertical phase difference signal derived from said second gate means over said plural detection areas;

first correction voltage producing means for producing a horizontal correction voltage in response to the output of said first averaging means to shift a horizontal deflection timing of at least one of said two different color channels; and second correction voltage producing means for producing a vertical correction voltage in response to the output of said second averaging means to shift a vertical deflection timing of at least one of said two different color channels.

6. A centering unit for a color television camera apparatus having plural pick-up tubes corresponding to different color channels comprising:

means for detecting edges contained in video signals corresponding to two different color channels and producing edge detection signals;

means for producing a sample gate signal corresponding to plural detection areas, said plural detection areas being previously assigned on a television screen;

first gate means for passing said edge detection signals in response to said sample gate signal;

means for detecting a horizontal timing difference between said edge detection signals derived from said first gate means and producing a horizontal phase difference signal;

means receiving said edge detection signals derived from said first gate means for producing vertical contour signals corresponding to said two different color channels;

means for detecting a vertical timing difference between said vertical contour signals and producing a vertical phase difference signal;

comparing means for comparing said vertical contour signals derived from said vertical contour signal producing means;

memory means for storing the output of said comparing means;

means for determining a correlation of each plural detection areas between two time points having at least one frame period by comparing the output read out from said memory means with the output of said comparing means;

second gate means for passing said horizontal and vertical phase difference signals in response to the high-correlation in each of said plural detection areas determined by said correlation determining means;

first averaging means for averaging said horizontal phase difference signal derived from said second gate means over said plural detection areas;

second averaging means for said vertical phase difference signal derived from said phase second gate means over said plural detection areas;

first correction voltage producing means for producing a horizontal correction voltage in response to the output of said first averaging means to shift a horizontal deflection timing of at least one of said two different color channels; and second correction voltage producing means for producing a vertical correlation voltage in response to the output of said second averaging means to shift a vertical deflection timing of at least one of said two different color channels.

7. A centering unit for a color television camera apparatus having plural pick-up tubes corresponding to different color channels:

first and second edge detection means for respectively detecting edges contained in video signals corresponding to the two different color channels and producing edge detection signals;

means for generating sample gate signals corresponding to plural detection areas being previously assigned on a television screen;

first gate means for operatively passing said edge detection signals in response to said sample gate signal;

first and second flip-flop means for respectively forming period signals representing the periods between said edge detection signals and the end of each horizontal line;

means for detecting a horizontal timing difference between said period signals derived from said first and second flip-flop means and producing a horizontal phase difference signal;

means receiving said period signals derived from said first and second flip-flop means for producing vertical contour signals corresponding to said two different color channels;

means for detecting a vertical timing difference between said vertical contour signals and producing a vertical phase difference signal;

memory means for storing said vertical contour signals;

means for determining a correlation of each plural detection areas between two time points having at least one frame period by comparing the vertical contour signals read out from said memory means with the vertical contour signals derived from said vertical contour producing means, the vertical contour signals to be compared corresponding to the same color channel;

second gate means for operatively passing said horizontal and vertical phase difference signals in response to the high-correlation in each of said plural detection areas determined by said correlation determining means;

first and second averaging means for respectively averaging said horizontal phase difference signal and said vertical phase difference signal derived from said second gate means over said plural detection areas;

first correction voltage producing means for producing a horizontal correction voltage in response to the output of said first averaging means to shift a horizontal deflection timing of at least one of said two different color channels; and second correction voltage producing means for producing a vertical correction voltage in response to the output of said second averaging means to shift a vertical deflection timing of at least one of said different color channels.

8. A centering unit as claimed in claim 7, wherein said vertical contour signal producing means produce said vertical contour signals by sampling and holding each of said period signals for each plural detection areas.

9. A centering unit as claimed in claim 8, wherein said second gate means passes said horizontal and vertical phase difference signals when the vertical contour signals derived from said vertical contour producing means are substantially the same as the vertical contour signals preceding at least one frame period.

* * * * *

UNITED STATES PATENT AND TRADEMARK OFFICE
CERTIFICATE OF CORRECTION

PATENT NO. : 4,388,641
DATED : June 14, 1983
INVENTOR(S) : Setsuo Yamamoto et al It is certified that error appears in the above-identified patent and that said Letters Patent is hereby corrected as shown below:

Column 9, line 3, before "a", change "to" to --on--.

Signed and Sealed this

Tenth Day of April 1984

[SEAL]

Attest:

GERALD J. MOSSINGHOFF

Attesting Officer    Commissioner of Patents and Trademarks